United States Patent
Gailloux et al.

(10) Patent No.: US 8,321,515 B1
(45) Date of Patent: Nov. 27, 2012

(54) DEFINED DELAYS TO SUPPORT CONSISTENT TIERED MESSAGING PERFORMANCE

(75) Inventors: Michael A. Gailloux, Overland Park, KS (US); Kenneth W. Samson, Belton, MO (US); Gautam M. Shah, Lake Forest, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 803 days.

(21) Appl. No.: 12/428,276

(22) Filed: Apr. 22, 2009

(51) Int. Cl.
*G06F 15/16* (2006.01)

(52) U.S. Cl. ......... 709/206; 709/224; 709/233; 709/235

(58) Field of Classification Search .................. 709/206
See application file for complete search history.

(56) References Cited

U.S. PATENT DOCUMENTS

| | | | | |
|---|---|---|---|---|
| 5,042,027 A | * | 8/1991 | Takase et al. | 370/252 |
| 5,381,546 A | * | 1/1995 | Servi et al. | 718/102 |
| 5,673,256 A | * | 9/1997 | Maine | 370/271 |
| 6,385,168 B1 | * | 5/2002 | Davis et al. | 370/230 |
| 6,473,622 B1 | * | 10/2002 | Meuronen | 455/466 |
| 6,567,855 B1 | * | 5/2003 | Tubbs et al. | 709/232 |
| 6,781,991 B1 | * | 8/2004 | Anderlind | 370/394 |
| 8,065,424 B2 | * | 11/2011 | Foresti et al. | 709/229 |
| 2003/0028640 A1 | * | 2/2003 | Malik | 709/226 |
| 2003/0065724 A1 | * | 4/2003 | Clark | 709/206 |
| 2008/0082678 A1 | * | 4/2008 | Lorch et al. | 709/230 |

* cited by examiner

*Primary Examiner* — Christopher Biagini

(57) ABSTRACT

A method for defining delays to support consistent tiered messaging performance is provided. The method comprises a query server receiving a message and the query server analyzing a class of service associated with the message. The method also comprises the query server injecting a defined delay prior to initiating processing of the message and the query server processing the message and storing the processed message in an outgoing queue. The method also comprises the query server sending a notification to a destination component that the message is available for retrieval and the query server releasing the message to the destination component upon request of the destination component.

13 Claims, 7 Drawing Sheets

FIG. 5
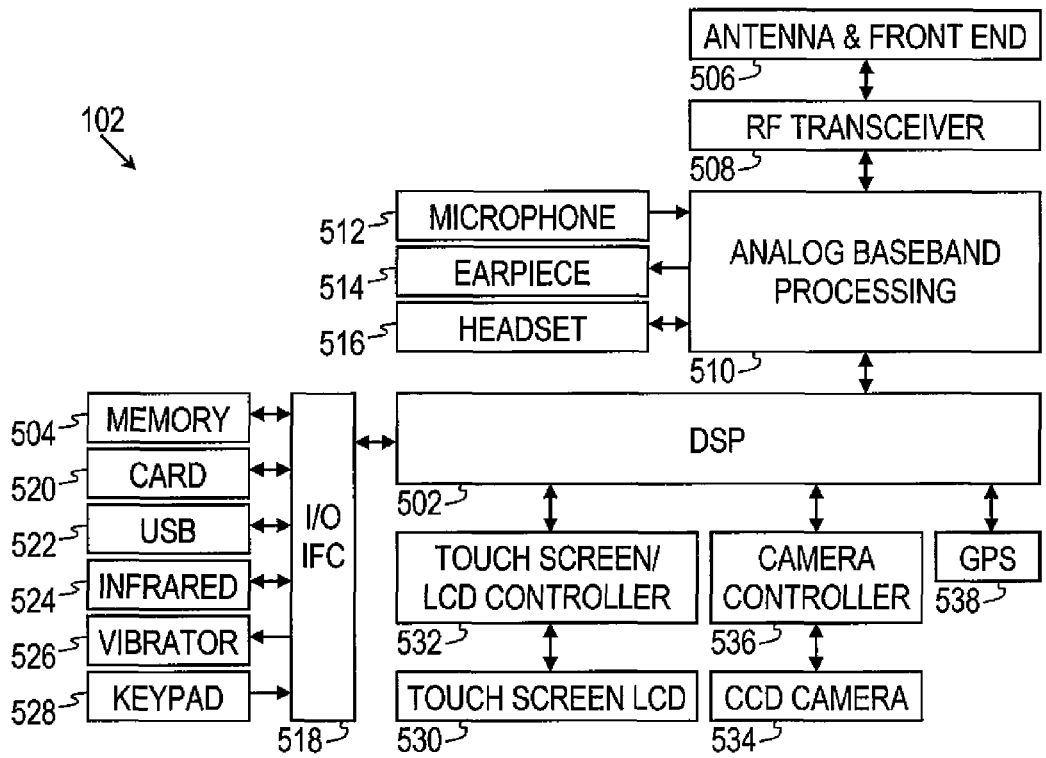
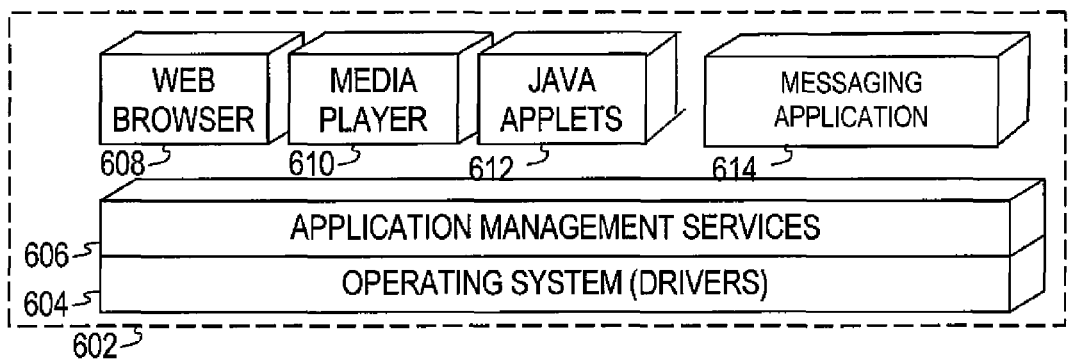
FIG. 6

DEFINED DELAYS TO SUPPORT CONSISTENT TIERED MESSAGING PERFORMANCE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic mail, short message service (SMS), and other electronic messages may be subject to a variety of delays during transmission from originating to receiving station. When messages pass through the infrastructure of a plurality of service providers, delays may occur at several points and may be unpredictable in duration.

SUMMARY

In an embodiment, a system for defining delays to support consistent tiered messaging performance is provided. The system comprises a computer system and an application, that when executed on the computer system receives a first message from a first originating device and determines a first service classification associated with the first message. The system also stores the first message in a first delay queue for a first time period, receives a second message from a second originating device, and determines a second service classification associated with the second message. The system also stores the second message in an incoming queue to await processing. At the expiration of the first time period, the system also moves the first message from the first delay queue to the incoming queue to await processing. The system also processes the first message and the second message and stores the first message in an outgoing queue and sends a notification to a first destination device that the first message is available for retrieval. The system also stores the second message in a second delay queue for a second time period. At the expiration of the second time period, the system also moves the second message from the second delay queue to the outgoing queue and sends a notification to a second destination device that the second message is available for retrieval. The system also receives a first request from the first destination device requesting release of the first message and releases the first message to the first destination device. The system also receives a second request from the second destination device requesting release of the second message and releases the second message to the second destination device.

In another embodiment, a method for defining delays to support consistent tiered messaging performance is provided. The method comprises a query server receiving a message, the query server analyzing a class of service associated with the message, and the query server injecting a defined delay prior to initiating processing of the message. The method also comprises the query server processing the message and storing the processed message in an outgoing queue. The method also comprises the query server sending a notification to a destination component that the message is available for retrieval. The method also comprises the query server releasing the message to the destination component upon request of the destination component.

In another embodiment, a processor-implemented method for defining delays to support consistent tiered messaging performance is provided. The method comprises a query server receiving a first message and the query server determining a first service classification of the first message. The method also comprises the query server delaying the processing of the first message for a defined time period based on at least one of current and projected network traffic conditions. At the expiration of the defined time period, the method also comprises the query server processing the first message and storing the first message in an outgoing queue. The method also comprises the query server sending a first notification to a first destination component that the first message is available for retrieval. The method also comprises the query server releasing the first message to the first destination component upon receiving a request from the first destination component. The method also comprises the query server receiving a second message and the query server determining a second service classification of the second message, wherein the second service classification is different from the first service classification. The method also comprises the query server processing the second message without a delay and storing the second message in the outgoing queue. The method also comprises the query server sending a second notification to a second destination component that the second message is available for retrieval and the query server releasing the second message to the second destination component upon receiving a request from the second destination component.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a mobile device according to an embodiment of the disclosure.

FIG. 6 is a block diagram of a software configuration for a mobile device according to an embodiment of the disclosure.

DETAILED DESCRIPTION

Figure 1:
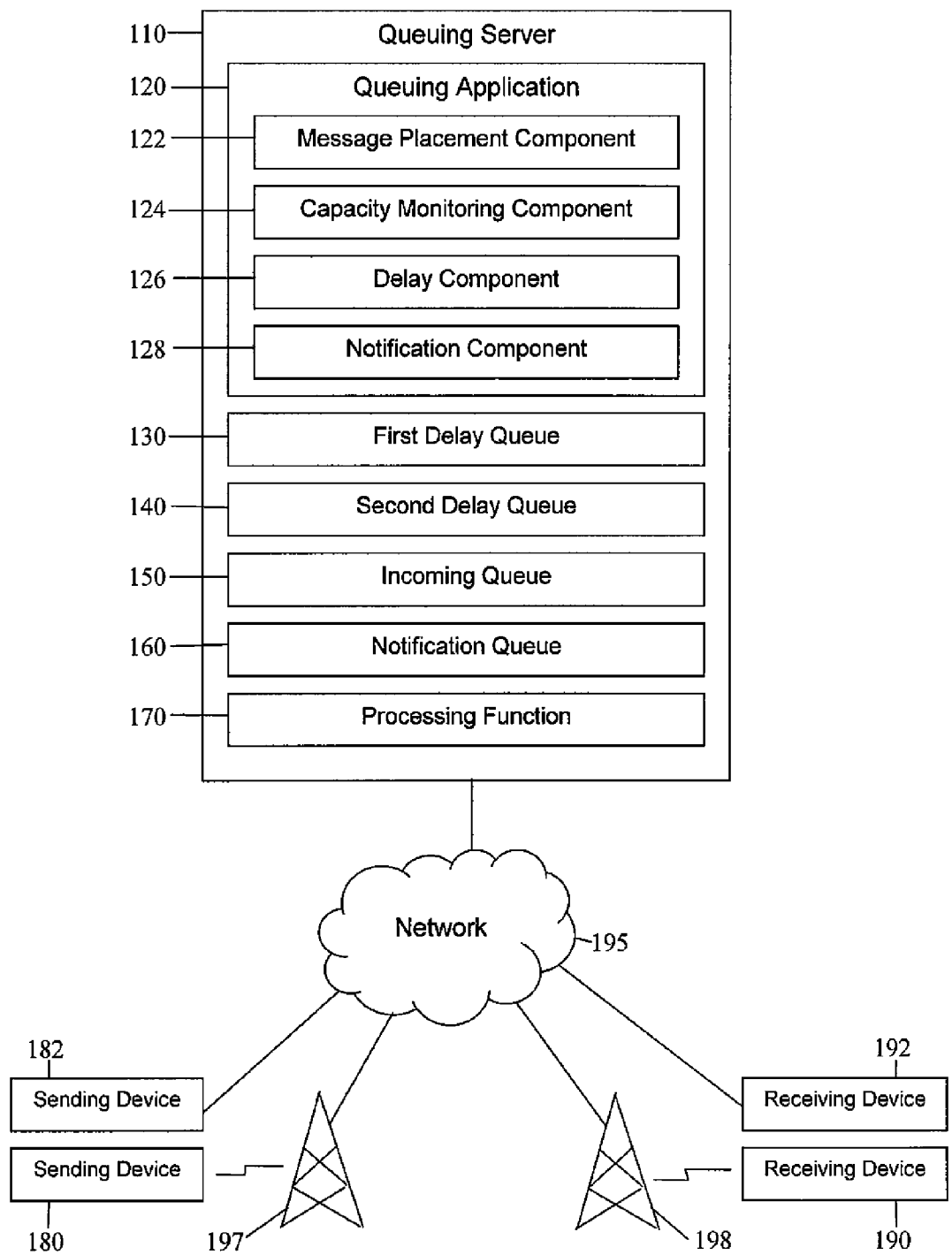
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system of defined delays to support consistent tiered messaging performance enable the selective insertion of time delays into the processing steps of electronic messages to standardize the expected total wait time for various classes of service. Time delays of varying lengths are intentionally inserted to supplement the expected normal variable delays that accompany electronic messages to achieve a consistent average total delay for each class of service. By building consistency into total message delivery wait times for various classes of services, a provider may differentiate quality of service levels and effectively manage perceptions about the value of service offerings. A provider may use the repeatedly reinforced and observable differences in service levels to monetize the higher speed delivery of premium messaging service. Reliable service delivery with consistent wait times may build customer loyalty across all service offerings. More extended regular delivery times for non-premium messaging may allow a provider to control and use expectations about that service to give non-premium customers incentives to upgrade their service to a higher level.

Further, in some embodiments, it is thought that adding delays in even the premium tier to produce a more consistent response time may actually improve satisfaction and reduce service calls. For example, if most messaging is complete within ten seconds and occasionally a message or two takes fifteen seconds, a customer is likely to be less concerned than when most messages take five seconds but then several messages take fifteen seconds (three times longer). The latter circumstance is more likely to lead to a call to customer care exploring what might be wrong.

The present disclosure teaches the insertion of time delays at various points during the intake, processing, and forwarding stages of an electronic message. At times of heavy traffic, non-premium messages may be delayed before processing to permit premium messages to receive processing priority and faster overall throughput. Delays may be inserted after processing to permit delivery time for various messages to reach the total expected wait times for each message's service classification. Once expectations have been properly set, a service provider may seek to avoid needlessly disrupting perceptions about service classifications. In an embodiment, a service provider may rely on a plurality of other service providers to process, forward, and deliver a message. The service provider may periodically send test messages across their own networks and across other providers' networks to determine transport times. The service provider may use this feedback loop to make adjustments to delays the provider inserts into messages to account for external congestion and other observed network conditions. When transport delays are long, the service provider may reduce or eliminate the inserted delays to some or all classes of messages to achieve target delivery times.

A standard initial delay, for example ten seconds, may be inserted into messages shortly after they are received by a service provider. The initial delay is a baseline delay upon which the service provider may layer on any additional imposed delays later during the handling of the message. When the service classification associated with the message is determined upon receipt, the provider may schedule additional delays to be added while the message is waiting to be processed as well as after the message has been processed and is awaiting retrieval by the destination device. Through the fundamental stages of queuing for processing, receiving processing, and post-processing, the service provider may make adjustments to scheduled delays it had been planning to insert into a message's path through its system.

Changes may be made to scheduled delays to raise or lower the total anticipated handling time for a message to meet the target of the customer's expected wait time. Unexpected delays may prompt a service provider to reduce a scheduled delay to maintain the targeted wait time expected by the customer and preserve the customer's service experience. In a contrasting scenario, an unexpected drop in message volume or sudden increase in network capacity may permit messages to be processed far faster than expected. A service provider may increase the length of one or more scheduled delays to compensate for the reduction in anticipated delay. This action again may permit the service provider to deliver the same expected wait time to the customer, and maintain service experience.

When a service provider has several classes of service, each with an expected wait time, changes in volume or network conditions may indicate adjustments to message delays to balance expected wait times across the service classifications. The service provider's objective is to achieve the targeted wait times set for each service classification and expected by the subscriber base. Consistency of messaging delivery time and quality across service tiers may reinforce positive perceptions about the value proposition of a service provider's suite of offerings.

Turning now to FIG. 1, a system 100 for defined delays to support consistent message delivery performance is provided. The system 100 comprises a queuing server 110, a queuing application 120, a first delay queue 130, a second delay queue 140, an incoming queue 150, a notification queue 160, a processing function 170, sending devices 180, 182, receiving devices 190, 192, a network 195, and base transceiver stations 197, 198.

The queuing application 120 receives a plurality of incoming messages from sending devices 180, 182. A message placement component 122 of the queuing application 120 determines the service classification associated with the messages and may store the messages in the first delay queue 130 for an initial delay, about ten seconds. After the initial delay, the queuing application 120 moves some messages immediately to the incoming queue 150. In an embodiment, other messages remain in the first delay queue 130 for an additional delay period and are then moved to the incoming queue 150. Messages are then drawn from the incoming queue 150 to the processing function 170 where they are processed. When processing is complete, messages are then either moved to a second delay queue 140 or directly to the notification queue 160. Messages moved to the second delay queue 140 remain there for a period of time and are then moved to the notification queue 160. Once messages arrive in the notification queue 160, a notification component 128 of the queuing application 120 sends notice to the intended receiving device 190, 192 that a message is waiting and releases the message to the receiving device 190, 192 upon request. In an embodiment, a capacity monitoring component 124 of the queuing application 120 tracks the current processing activity and capacities of the system 100 and of external service providers (not shown) that may assist in transporting messages. A delay component 126 of the queuing application 120 works with the other components of the queuing application 120 and system 100 to determine the classifications of messages that should be delayed, where they should be delayed, and the duration of delays.

The queuing server 110 may be a computer system. Computer systems are discussed in greater detail hereinafter. The queuing server 110 may comprise one computer or a plurality of computers, for example, a server farm wherein many server computers cooperate to share a processing load. The queuing server 110 may comprise a plurality of computers that are located at different places, for example, to provide geographical diversity and increased service reliability. The queuing server 110 executes one or more applications that provide services including hosting of the queuing application 120.

The queuing application 120 executes on the queuing server 110 and provides a suite of message queuing and delay services that receive, classify, and queue messages before and after processing as well as monitoring traffic internal and external to the system 100 that may impact message queuing, delay and forwarding operations. Messages may comprise electronic mail, short message service (SMS) messages, text and multi-media messages, text messages, and/or other messages.

The queuing application 120 comprises a message placement component 122 that takes delivery of messages and determines a service classification associated with the messages. A provider of wireless messaging services may sell services under a plurality of subscription plans providing a range of service classifications. Some service plans may call for payment for services in advance and allow basic messaging while more expensive plans allow payment after the conclusion of a service period and provide higher speed message delivery. The message placement component 122 associates the classification of service with each incoming message received and places the message in the first delay queue 130 or the incoming queue 150. The message placement component 122 in placing messages may follow general policies prescribed for the placement of messages in queues and the delays to which messages may be subjected while in queues. In addition to enforcing standard policies regarding the scheduling and duration of delays for various message classifications, the message placement component 122 may also follow specific directives for message placement that may arise from transport delay.

The message placement component 122 may determine a service classification for a received message by detecting a flag placed in the message by the sending device 180, 182 or other component. The flag itself may identify a service classification or its presence instead may alert the message placement component 122 to consult the subscription level of the sending device 180, 182 that the message placement component 122 may periodically check. Alternatively, the message placement component 122 may, upon receipt of a message, determine a service classification for the message by observing an attribute or other characteristic of the sending device 180, 182. The former alternative, that of the sending device 180, 182 or another component setting a flag in the message and thereby alerting the message placement component 122 upon receipt to check the subscription service associated with the sending device 180, 182, may result in less processing overhead for the system 100.

The capacity monitoring component 124 of the queuing application 120 observes the receipt and throughput of messaging activity through the system 100 by the various service classifications of messages and provides information to the other components of the system 100. Information about the volume and service classifications of messages being received and flowing through the system 100 may be useful to the delay component 126 in determining whether certain or all classifications of messages should be delayed in the first delay queue 130 before processing, in the second delay queue 140 after processing, in both queues, or in neither queue. The capacity monitoring component 124 observes message processing operations in the processing function 170 to determine the length of time consumed for messages of various classifications to be fully processed and exit the processing function 170. The capacity monitoring component 124 also monitors activity on the networks of external service providers as they may be involved in assisting the delivery or processing of a message. The capacity monitoring component 124 provides a feedback loop back to the queuing server 110 about external network conditions. In an embodiment, a service provider may have account relationships with other service providers and periodically send test messages through the other service providers' networks to determine capacity and processing speed. This input, as well as information about activity and capacity on the service provider's own network, may be useful in determining the type and duration of delays to which various classifications of messages should be subjected at different times.

The delay component 126 of the queuing application 120 determines delays to be enforced in the handling of messages prior to processing in the first delay queue 130, after processing in the second delay queue 140, or at another time. The present disclosure teaches that consistent, tolerable total message wait times for various classes of messaging services may be achieved by supplementing the normal varying delays experienced in message processing with intentionally inserted delays to maintain an acceptable average total message wait time. The delay component 126, using real time input received from the capacity monitoring component 124 as well as historical information, determines the amount of time delay that should be added to a message for the total wait time to reach the predetermined total wait time for a message, given the message's service classification. The delay component 126 may at other times determine how much a previously scheduled delay should be reduced given total volume through the system 100 and specific activity in the processing function 170 during specific times. The delay component 126 sets standard delay policy at various times of the day and days of the week for different service classifications as well as making real time increases or decreases to scheduled delays when warranted by current observed activity in the system 100 or external to it.

The delay component 126 may under normal conditions subject messages of each service classification to a brief initial delay, for example ten seconds, in the first delay queue 130 to establish a baseline. The delay component 126 may hold non-premium messages in the first delay queue 130 for an additional period to permit premium messages to pass through and enter the incoming queue 150 first and thereby receive processing more rapidly. The delay component 126 may hold messages of all service classifications in the first delay queue 130 for an additional period as part of normal scheduling and selectively decrease or eliminate that time period as necessary when unexpected transport delays elsewhere are identified. When messages of various classifications have passed through the first delay queue 130, have then waited in the incoming queue 150, and finally been processed in the processing function 170, then they may be delayed again after processing by the delay component 126 in the second delay queue 140. In an embodiment, messages may be delayed after processing in the second delay queue 140 if additional time is added for the total wait time for the service classification of a particular message to reach the expected wait time. The additional wait time in the second delay queue 140 may have been previously scheduled and may be standard for one or more service classifications or instead it may have been necessitated by an unexpected drop-off in volume that resulted in messages processing more quickly than expected. The delay component 126 receives regular information from the capacity monitoring component 124 about volume and processing activity within the system 100 and network activity external to the system 100. The delay component 126 also communicates with the message placement component 122 about the receipt, classification, and placement of messages at various points in the system 100.

The notification component 128 of the queuing application 120 observes as processed messages are entered into the notification queue 160 in a state ready for retrieval by the intended receiving device 190, 192. Messages entering the notification queue 160 have been processed by the processing function 170 and then been delayed for a time period in the second delay queue 140 for a time period or come directly from the processing function 170. When a processed message enters the notification queue 160, the notification component 128 sends a notification to the intended receiving device 190, 192 notifying it that it has a message waiting. When the notification component 128 receives a reply from the receiving device 190, 192, it allows the receiving device 190, 192 to retrieve the message and the message leaves the notification queue 160. In an embodiment, when a message is small in size, for example a text message comprising a few characters, the notification component 128 may send the message to the intended receiving device 190, 192 with the initial notification rather than waiting for the intended receiving device 190, 192 to retrieve the message in a reply transmission.

The first delay queue 130 is associated with the queuing server 110 and is a queue in which an incoming message may be placed by the message placement component 122 after the service classification of the message has been determined. Messages are held in the first delay queue 130 before they are released into the incoming queue 150 and subsequently processed by the processing function 170. In an embodiment, the first delay queue 130 may comprise a plurality of component queues dedicated to individual service classifications of messages.

The second delay queue 140 is associated with the queuing server 110 and is a queue in which a message may be placed after the message has been processed by the processing function 170 but before the processed message is placed into the notification queue 160. Processed messages may be held in the second delay queue 140 for a plurality of reasons, including the intentional addition of a delay to permit the total wait time for a message to reach the total expected wait time for the message given the service classification of the message. In an embodiment, the second delay queue 140 may comprise a plurality of sub-queues with each sub-queue dedicated to an individual service classification of messages and each service classification assigned an individual delay time.

The incoming queue 150 is associated with the queuing server 110 and is a queue in which a message is placed while awaiting the processing function 170 to commence processing operations on the message. In an embodiment, the incoming queue 150 may comprise a plurality of component sub-queues with each sub-queue dedicated to specific service classifications of messages, for example.

The notification queue 160 is associated with the queuing server 110 and is a queue in which a message is placed after receiving processing by the processing function 170 and after receiving a delay, if any, in the second delay queue 140. Once a message has been transitioned to the notification queue 160, the notification component 128 may send notice to the receiving device 190 that a message is waiting and may be retrieved. In an embodiment, as messages enter the notification queue 160, they may be prioritized by service classification and notices may be sent to receiving devices 190, 192 according to this priority.

In an embodiment, the system 100 may not employ the first delay queue 130 to temporarily delay some messages before passage to the incoming queue 150 and after processing may not employ the second delay queue 140 to temporarily delay some messages before passage to the notification queue 160. In an embodiment, processing logic may be added to the incoming queue 150 and the notification queue 160 enabling these components to choose when to release specific messages to the processing function 170 and release specific messages to receiving devices 190, 192, respectively. This alternative embodiment may result in more processing overhead for certain processors in the system 100. Alternatively, in an embodiment, a single queue may be employed to receive messages and delay the messages before sending notification to receiving devices 190, 192 to retrieve the messages. For example, timers and/or time-out values may be associated with each message and employed to manage appropriate delays for each subject message.

The processing function 170 is associated with the queuing server 110 and comprises actions including billing, switching, and determination of routing information related to the path of a message to its intended receiving device 190, 192. The processing activities taking place and any accompanying delays within the processing function 170 are monitored by the capacity monitoring component 124 and reported to the delay component 126 for its use in making adjustments to previously scheduled delays. Unexpected delays or extended processing times occurring at stages of the processing function 170 may result in the delay component 126 reducing scheduled delays in one or the other or both the first delay queue 130 and the second delay queue 140. Likewise, if the processing function 170 completes its processing operations on one or more messages more quickly than had been expected, the delay component 126 may increase the scheduled delays for some or all classifications of messages.

The sending devices 180, 182 and the receiving devices 190, 192 may comprise portable electronic devices including mobile telephones, laptop computers, media players, personal digital assistants (PDA), and tablet computers. The sending devices 180, 182 and the receiving devices 190, 192 may also comprise desktop computers. In an embodiment, sending devices 180, 182 may be able to specify a priority for some messages.

The network 195 promotes communication between the components of the system 100. The network 195 may be any communication network including a public data network (PDN), a public switched telephone network (PSTN), a private network, and/or a combination thereof.

The wireless base stations 197, 198 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; or other wireless access device.

Figure 2:
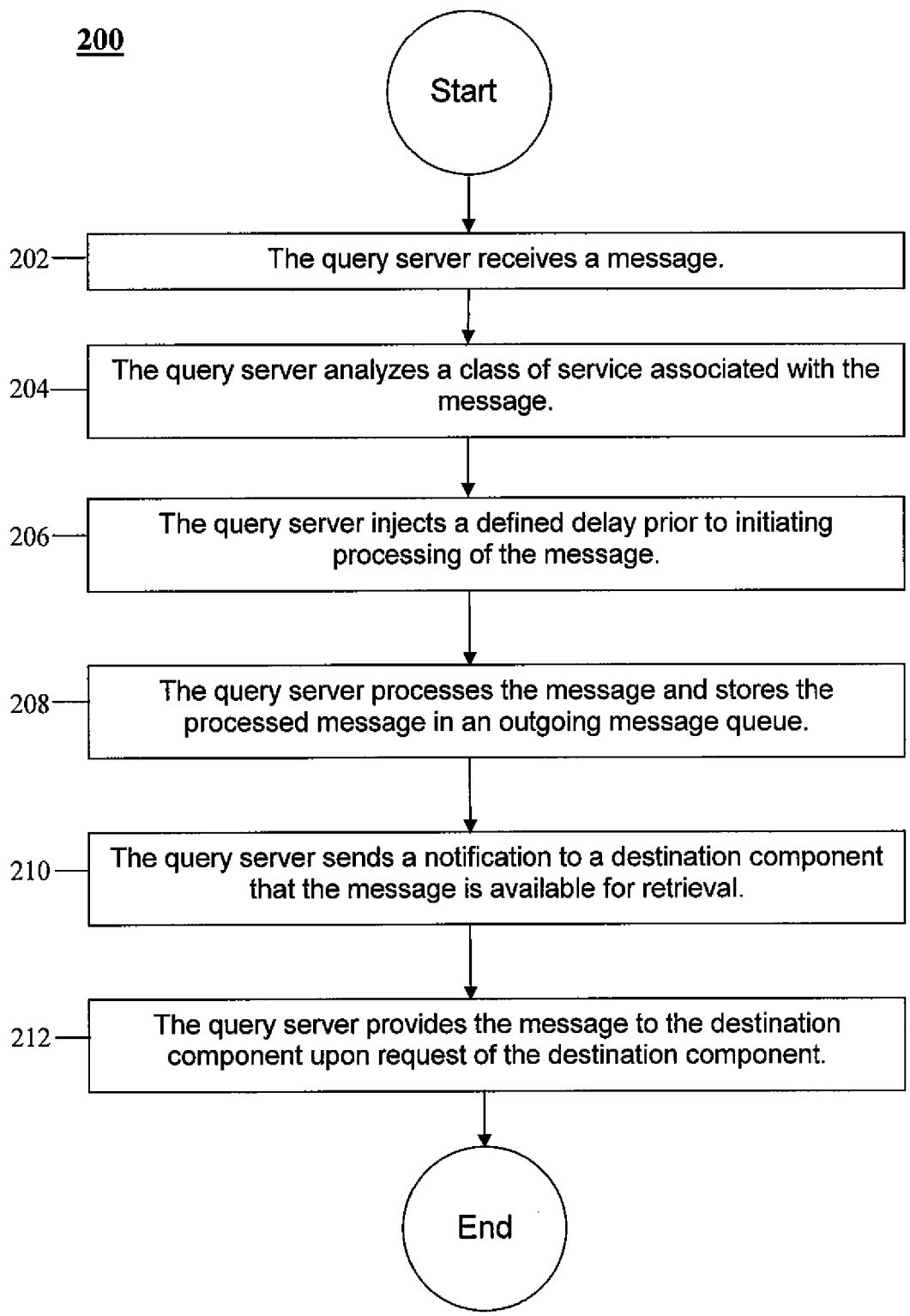
FIG. 2 is a flow chart illustrating a method according to an embodiment of the disclosure.

Turning now to FIG. 2, a method 200 for defining delays to support consistent tiered messaging performance is provided. Beginning at block 202, the message placement component 122 of the queuing application 120 receives a message.

At block 204, the message placement component 122 analyzes a class of service associated with the message. The message may include a header portion or other coding that indicates the classification of service of the party that sent the message. In some cases, such as in an emergency, a message may have a class of service unrelated to a user's subscription plan and the message is processed according to coding indicating the emergency or other exceptional situation.

At block 206, the message placement component 122 injects a defined delay prior to initiating processing of the message. This action may take the form of placing the message in the first delay queue 130. In an embodiment, messages of every service classification may receive a brief initial delay, for example ten seconds, to establish a baseline delay for all messages. After the initial delay, messages may receive additional delays of varying lengths or no additional delay before passing to the incoming queue 150. The length of any scheduled additional delay in the first delay queue 130 may be related to extending the total wait time to an expected wait time. However, if the capacity monitoring component 124 should determine, for example, that the processing function 170 or an external service provider is operating very slowly with internal delays and bottlenecks, the scheduled additional delay may be intentionally reduced by the delay component 126 so as not to exceed the total expected wait time for messages of the service classifications flowing through the system 100.

A delay duration normally scheduled in the first delay queue 130 may be set at a level that permits user expectations to be met while also being available for significant reduction or even elimination should the need arise. In an embodiment, the duration of an initial delay and an additional delay for a message in the first delay queue 130 prior to processing may be fixed and may depend on the service classification of the message. In an embodiment, an the delay for a message in the first delay queue 130 prior to processing may be variable and based at least in part on current message transport conditions.

At block 208, the message is released from the first delay queue 130. The message then passes through the incoming queue 150, is processed by the processing function 170, and is stored in the notification queue 160. At block 210, the notification component 128 sends a notification to the destination component or receiving device 190 that a message is being held in the notification queue 160 for the receiving device 190. At block 212, the notification component 128 releases the message to the receiving device 190 upon request of the receiving device 190.

Figure 3A:
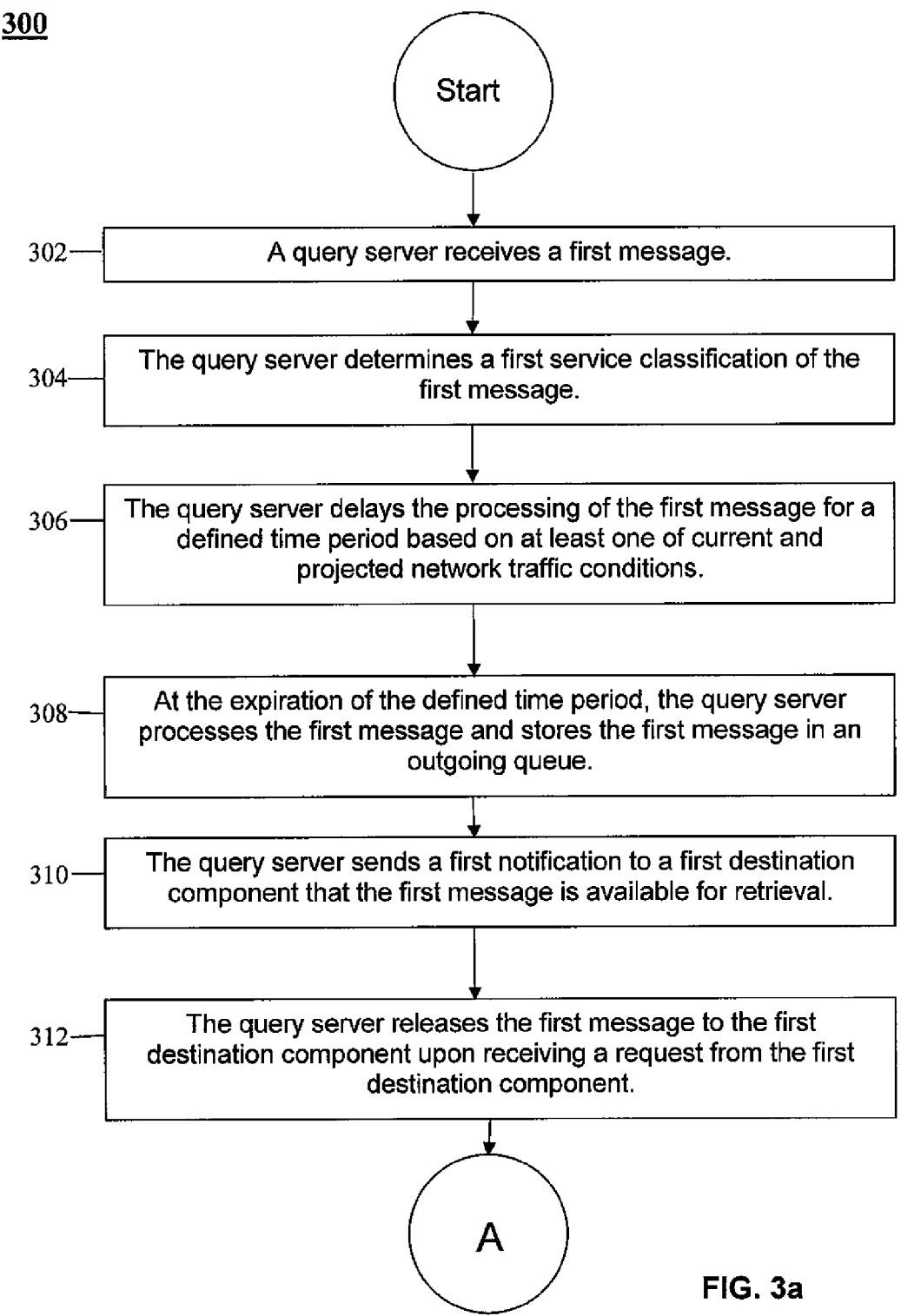
FIG. 3a and FIG. 3b are two stages of a flow chart illustrating another method according to an embodiment of the disclosure.
Figure 3B:
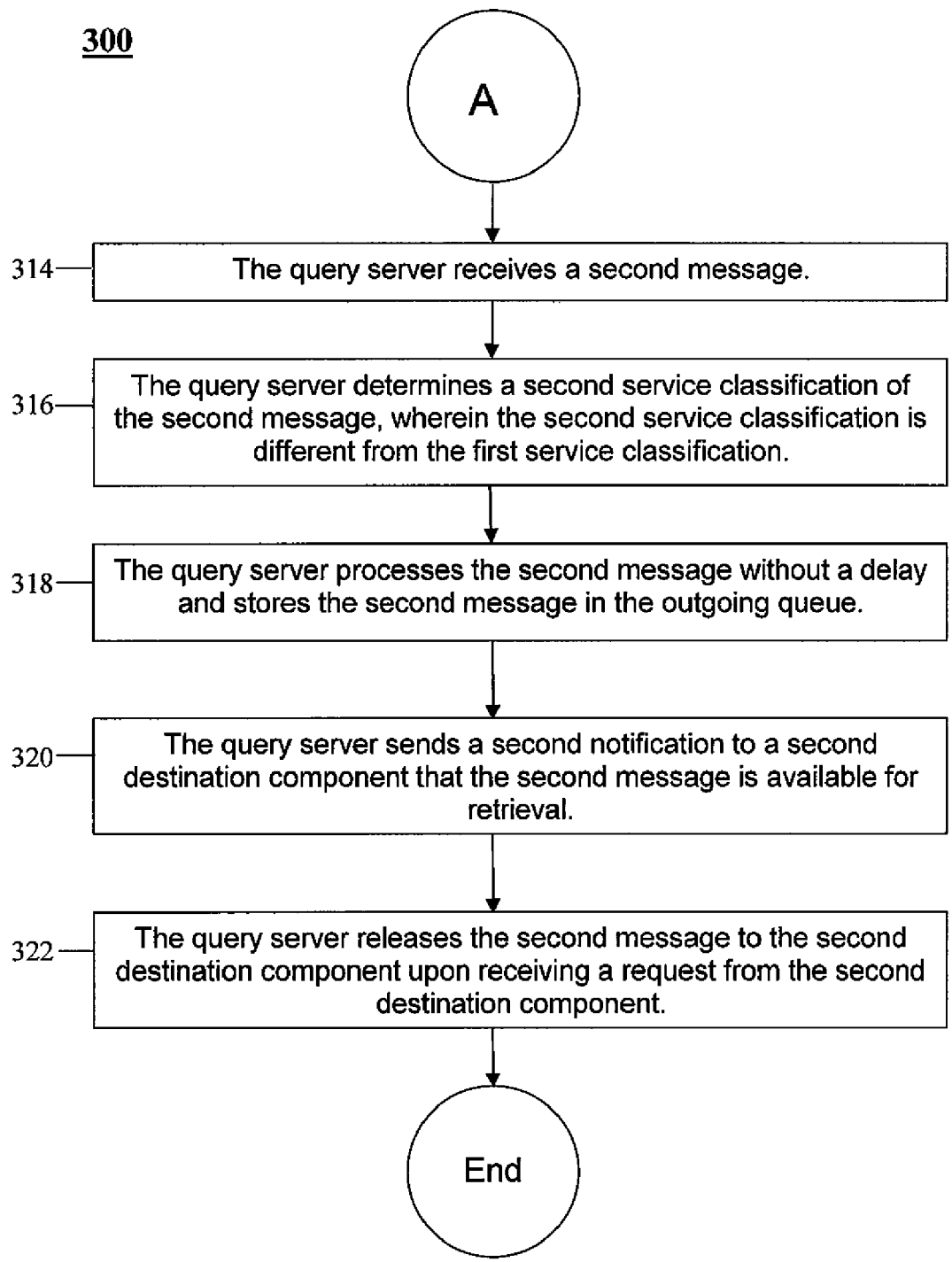

Turning now to FIG. 3a and FIG. 3b, a method 300 for defining delays to support consistent tiered messaging performance is provided. Blocks 302 through 312 of the method 300 are substantially similar to the method 200. At block 302 a first message is received and at block 304, the message placement component 122 determines the first service classification of the first message. At block 306, the first message is placed in the first delay queue 130 for a defined time period. The defined time period may be based on current and/or projected network traffic conditions. At the expiration of the defined time period, the first message at block 308 is removed from the first delay queue 130, is passed through the incoming queue 150, is processed by the processing function 170, and is placed in the notification queue 160. At block 310, the notification component 128 notifies the receiving device 190 that the first message is waiting for the receiving device 190 in the notification queue 160, and at block 312, the first message is released to the receiving device 190 upon request of the receiving device 190.

At block 314, a second message is received in the system 100. At block 316, the message placement component 122 determines the second service classification of the second message wherein the second service classification is different from the first service classification associated with the first message received earlier in the method 300 at block 302. In an embodiment, it may be determined that the second service classification is associated with a premium subscription account with a service provider and the first service classification is associated with a non-premium subscription account with the service provider.

At block 318, the queuing application 120 processes the second message without any additional delay beyond a standard delay to which all messages may be subject. The action at block 318 stands in contrast to the action at block 306 wherein the first message was held in the first delay queue 130 for a period that may have been extended beyond the aforementioned standard delay. In an embodiment, messages of the first service classification, a non-premium classification, may be held in the first delay queue 130 while messages of the second service classification, a premium classification, may be given priority, bypass the first delay queue 130, and go immediately through the incoming queue 150 to the processing function 170. At block 318, when processing of the second message has been completed, the second message is placed in the notification queue 160.

At block 320, the notification component 128 notifies the receiving device 190 that the second message is waiting for the receiving device 190 in the notification queue 160 and at block 322, the second message is released to the receiving device 190 upon request of the receiving device 190.

After block 318 and before block 320, the second message may, upon the determination of the delay component 126, be held in the second delay queue 140 before passing into the notification queue 160 for release to the receiving device 190. This action may take place if the processing of the second message took place more quickly than expected and releasing the second message would take place materially earlier than the time expected for messages of the second classification. The present disclosure teaches the adoption and adherence to targeted wait times for various service classifications of messages. Adherence suggests not delivering messages beyond the expected wait time but also not delivering messages significantly earlier than the expected wait time as maintaining steady expectations is a teaching of some embodiments of the present disclosure. The tiered approach suggested herein teaches maintaining different and separate expectations for each tier or level of messaging service and working to avoid disturbing perceptions about such service expectations. The second delay queue 140 may be used to delay the availability of processed messages to allow wait time to reach the expected wait times and maintain previously set expectations.

Because the second service classification is associated with a premium subscription plan and the first service classification is associated with a non-premium subscription plan, in an embodiment, delays associated with the first delay queue 130 may be greater than delays associated with the second delay queue 140. Messages associated with the first service classification may therefore receive longer delays than messages associated with the second service classification to permit messages associated with the second service classification to be more rapidly processed and made accessible to their intended receiving devices 190, 192 in the notification queue 160.

Figure 4:
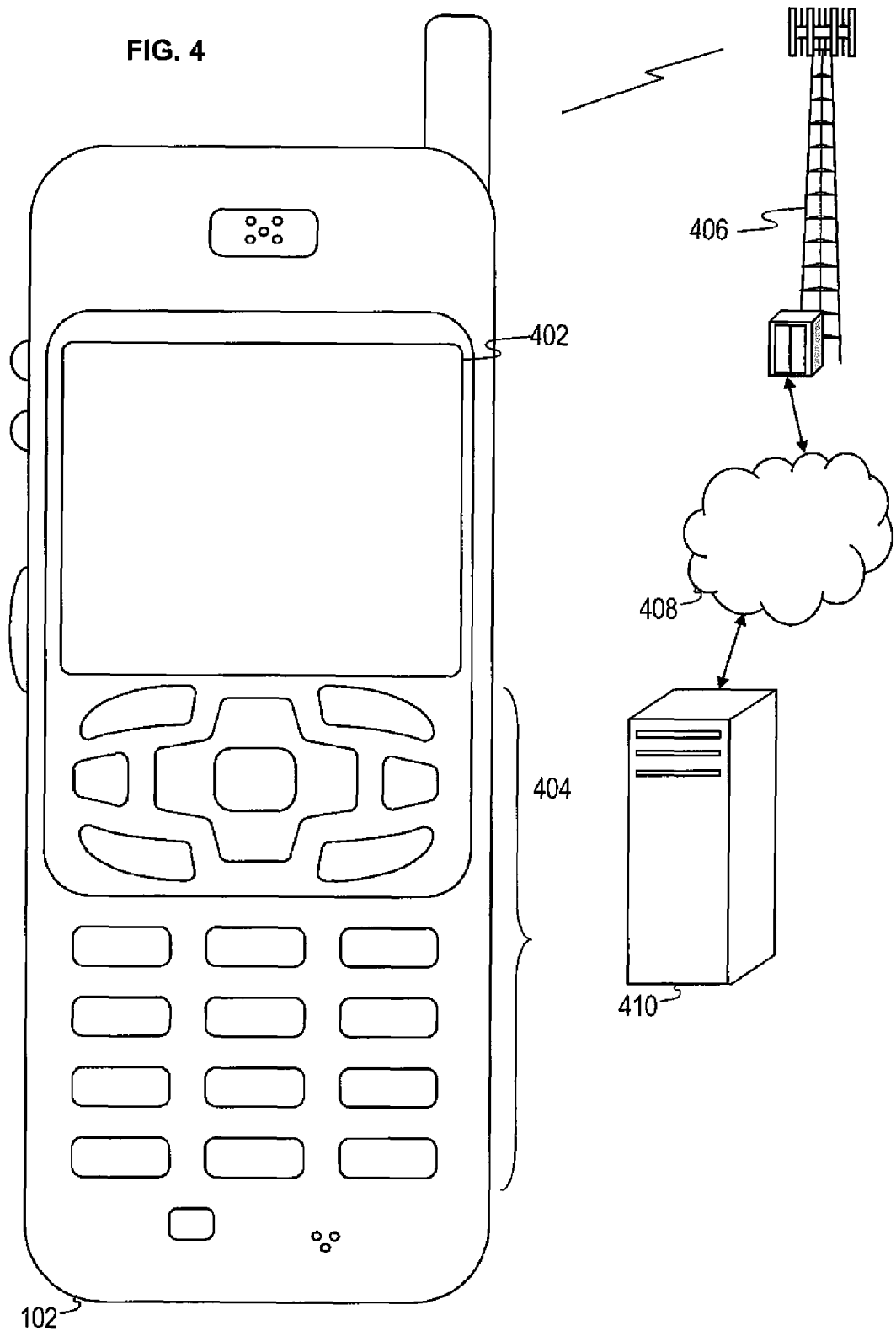
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may be an exemplary embodiment of the sending devices 180, 182 and the receiving devices 190, 192 described herein. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The messaging application 614 comprises at least one software application used to generate and send messages as taught herein.

Figure 7:
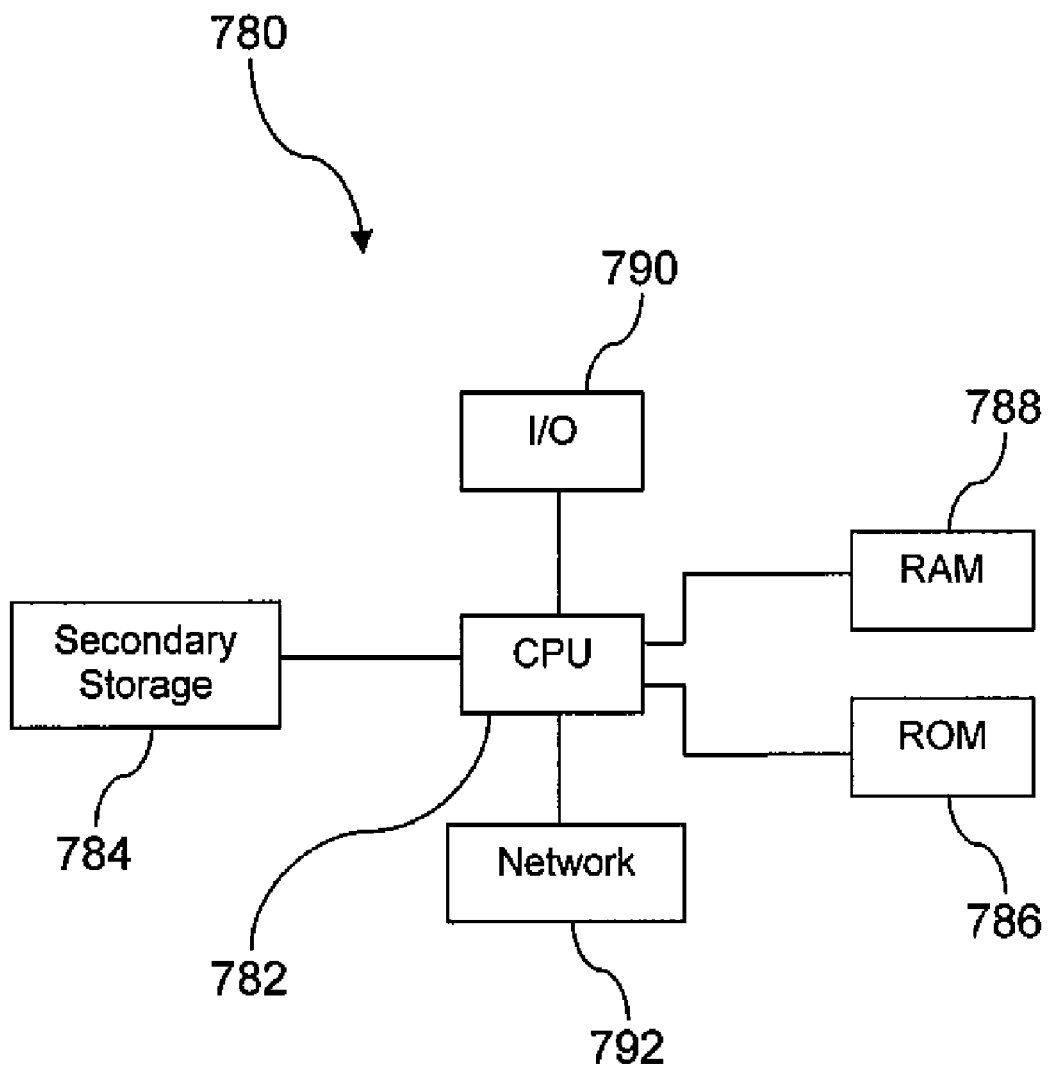
FIG. 7 illustrates an exemplary computer system suitable for implementing some aspects of the several embodiments of the disclosure.

Some aspects of the system described above may be implemented on any computer with sufficient processing power, memory resources, and network throughput capability to handle the necessary workload placed upon it. FIG. 7 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 780 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for defining delays to support consistent tiered messaging performance, comprising:
   a computer system; and
   an application, that when executed on the computer system,
      receives a first message from a first originating device,
      determines a first service classification associated with the first message,
      stores the first message in a first delay queue for a first time period,
      receives a second message from a second originating device,
      determines a second service classification associated with the second message, wherein the second service classification is associated with a premium subscription plan,
      stores the second message in an incoming queue to await processing,
      at the expiration of the first time period, moves the first message from the first delay queue to the incoming queue to await processing,
      processes the first message and the second message,
      stores the processed first message in an outgoing queue and sends a notification to a first destination device that the processed first message is available for retrieval,
      stores the processed second message in a second delay queue for a second time period,
      at the expiration of the second time period, moves the processed second message from the second delay queue to the outgoing queue and sends a notification to a second destination device that the processed second message is available for retrieval,
      receives a first request from the first destination device requesting release of the first message and releases the first message to the first destination device, and
      receives a second request from the second destination device requesting release of the second message and releases the second message to the second destination device.

2. The system of claim 1, wherein the first time period associated with the first delay queue is greater than the second time period associated with the second delay queue.

3. The system of claim 1, wherein the duration of the first time period is determined based on processing the second message before the first message.

4. The system of claim 3, wherein the duration of the first time period is additionally based on delaying the first message to permit the total wait time for the first message to reach an expected duration.

5. The system of claim 1, wherein the second time period is adjustable based on the total wait time for the second message to reach an expected duration.

6. The system of claim 1, wherein the total wait time for the first message corresponds to the service classification associated with the first message and the total wait time for the second message corresponds to the service classification associated with the second message.

7. The system of claim 1, wherein the application further delays the first message and the second message for an additional standard time period before service classification is determined.

8. A processor-implemented method for defining delays to support consistent tiered messaging performance, comprising:

a query server receiving a first message;

the query server determining a first service classification of the first message;

the query server delaying the processing of the first message for a defined time period based on at least one of current and projected network traffic conditions;

at the expiration of the defined time period, the query server processing the first message and storing the first message in an outgoing queue;

the query server sending a first notification to a first destination component that the first message is available for retrieval;

the query server releasing the first message to the first destination component upon receiving a request from the first destination component;

the query server receiving a second message;

the query server determining a second service classification of the second message, wherein the second service classification is different from the first service classification, and wherein the second service classification is associated with a premium subscription plan;

the query server processing the second message without a delay and storing the processed second message in a delay queue for a second time period, at the expiration of the second time period, the query server moving the processed second message from the delay queue to the outgoing queue;

the query server sending a second notification to a second destination component that the second message is available for retrieval; and the query server releasing the second message to the second destination component upon receiving a request from the second destination component.

9. The method of claim 8, wherein the first message is not delayed after processing.

10. The method of claim 8, wherein the second message is delayed after processing.

11. The method of claim 8, further comprising the query server sending messages to determine current network traffic conditions and project future network traffic conditions.

12. The method of claim 11, wherein the query server sends messages to determine network traffic conditions between a plurality of message originating and destination areas.

13. The method of claim 8, wherein the first message and the second message are short message service (SMS) messages and are sent to the first destination component and the second destination component, respectively, with the first notification and the second notification, respectively.

* * * * *